US012737979B2

(12) United States Patent
Ota

(10) Patent No.: US 12,737,979 B2
(45) Date of Patent: Sep. 15, 2026

(54) INFORMATION PROCESSING APPARATUS AND METHOD, AND STORAGE MEDIUM

(71) Applicant: CANON KABUSHIKI KAISHA, Tokyo (JP)

(72) Inventor: Yuya Ota, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 171 days.

(21) Appl. No.: 18/609,025

(22) Filed: Mar. 19, 2024

(65) Prior Publication Data

US 2024/0257457 A1 Aug. 1, 2024

Related U.S. Application Data

(63) Continuation of application No. PCT/JP2022/036386, filed on Sep. 29, 2022.

(30) Foreign Application Priority Data

Oct. 4, 2021 (JP) ................................ 2021-163724

(51) Int. Cl.

*G06T 11/10* (2026.01)
*G06T 15/04* (2011.01)
*G06T 17/05* (2011.01)

(52) U.S. Cl.

CPC .............. *G06T 17/05* (2013.01); *G06T 11/10* (2026.01); *G06T 15/04* (2013.01)

(58) Field of Classification Search

CPC ....... G06T 17/05; G06T 11/001; G06T 15/04; G06T 17/00; H04N 13/243

See application file for complete search history.

(56) References Cited

U.S. PATENT DOCUMENTS 10,997,239 B2 5/2021 Ota
11,025,878 B2 6/2021 Ota
11,334,621 B2 5/2022 Ota
2007/0279494 A1* 12/2007 Aman .................... H04N 5/262 348/169
2008/0209149 A1* 8/2008 Meyer ..................... G06F 9/355 712/30

(Continued)

FOREIGN PATENT DOCUMENTS

JP 2017-212593 A 11/2017
JP 2019-106144 A 6/2019

(Continued)

OTHER PUBLICATIONS

Notice of Reasons for Refusal issued by the Japanese Patent Office on Sep. 19, 2025 in corresponding JP Patent Application No. 2021-163724, with English translation.

(Continued)

*Primary Examiner* — Kent W Chang
*Assistant Examiner* — Karl Duc Truong
(74) *Attorney, Agent, or Firm* — Carter, DeLuca & Farrell LLP

(57) ABSTRACT

An information processing apparatus controls, based on a change with time passage in a three-dimensional model of an object that is generated based on a plurality of videos obtained from a plurality of image capture apparatuses, a frequency of the generation of the three-dimensional model of the object.

14 Claims, 12 Drawing Sheets

(56) References Cited

U.S. PATENT DOCUMENTS

| | | | | |
|---|---|---|---|---|
| 2009/0315978 | A1* | 12/2009 | Wurmlin | G06T 7/85 348/E13.001 |
| 2013/0300740 | A1* | 11/2013 | Snyder | G06T 17/00 345/419 |
| 2016/0140733 | A1* | 5/2016 | Gu | H04N 13/172 348/43 |
| 2019/0266786 | A1* | 8/2019 | Kobayashi | G06T 17/00 |
| 2019/0311526 | A1* | 10/2019 | Sugio | H04N 13/194 |
| 2021/0303870 | A1* | 9/2021 | Yang | G06V 10/82 |
| 2022/0237849 | A1* | 7/2022 | Lindh | G06T 13/40 |
| 2022/0408069 | A1 | 12/2022 | Ota | |

FOREIGN PATENT DOCUMENTS

| | | | |
|---|---|---|---|
| JP | 2021022032 | A * | 2/2021 |
| WO | 2019/082958 | A1 | 5/2019 |

OTHER PUBLICATIONS

International Search Report issued by the Japan Patent Office on Dec. 20, 2022 in corresponding International Application No. PCT/JP2022/036386, with English translation.

* cited by examiner

FIG. 3

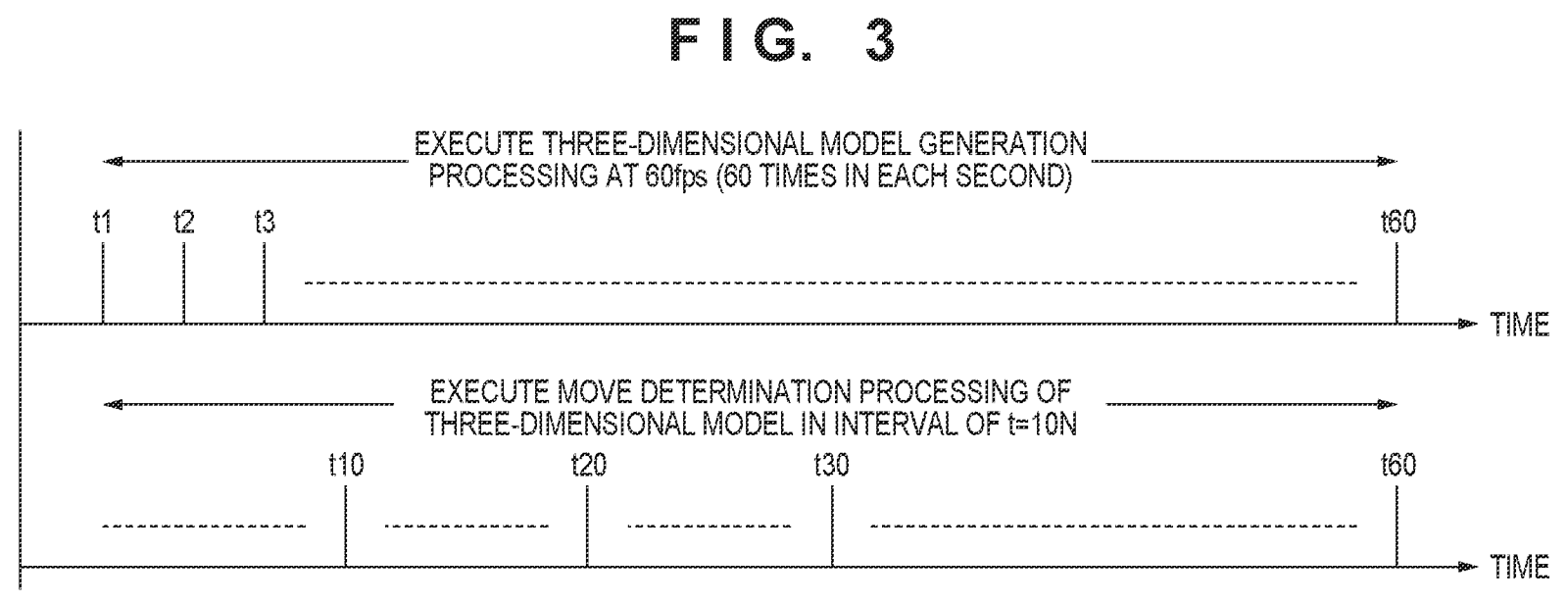

EXECUTE THREE-DIMENSIONAL MODEL GENERATION PROCESSING AT 60fps (60 TIMES IN EACH SECOND)

t1 t2 t3 t60

TIME

EXECUTE MOVE DETERMINATION PROCESSING OF THREE-DIMENSIONAL MODEL IN INTERVAL OF t=10N t10 t20 t30 t60

TIME

START MOVE DETERMINATION PROCESSING
LOOP OVER NUMBER OF MODELS (i=1..N)
S801
CALCULATE MOBILITY OF MODEL i
S802
S803
IS MOBILITY OF MODEL i < THRESHOLD A ?
NO
YES
S804
DATA REDUCTION LEVEL = 1
S805
IS MOBILITY OF MODEL i <THRESHOLD B ?
NO
YES
S806
DATA REDUCTION LEVEL = 2
S807
DATA REDUCTION LEVEL = 3
END

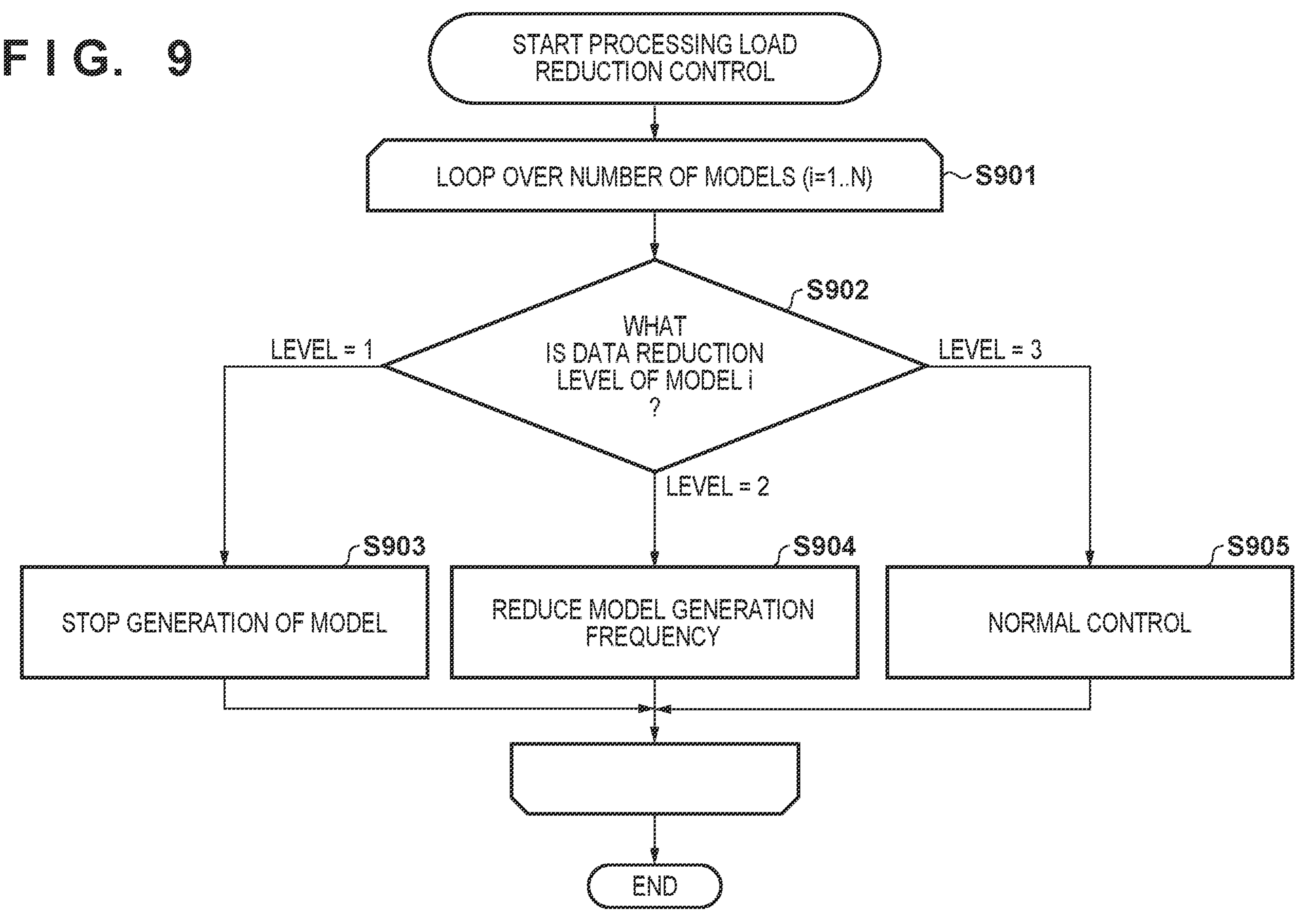
F I G. 9
START PROCESSING LOAD REDUCTION CONTROL
LOOP OVER NUMBER OF MODELS (i=1..N)
S901
S902
WHAT IS DATA REDUCTION LEVEL OF MODEL i ?
LEVEL = 1
LEVEL = 3
LEVEL = 2
S903
STOP GENERATION OF MODEL
S904
REDUCE MODEL GENERATION FREQUENCY
S905
NORMAL CONTROL
END START MOVE DETERMINATION PROCESSING
LOOP OVER NUMBER OF MODELS (i=1..N)
S1101
S1102
IS MODEL i TARGET OF PROCESSING LOAD REDUCTION ?
NO
YES
CALCULATE MOBILITY OF MODEL i
S1103
S1104
IS MOBILITY OF MODEL i < THRESHOLD ?
NO
YES
S1105
DATA REDUCTION FLAG = 1
S1106
DATA REDUCTION FLAG = 0
END F I G. 12
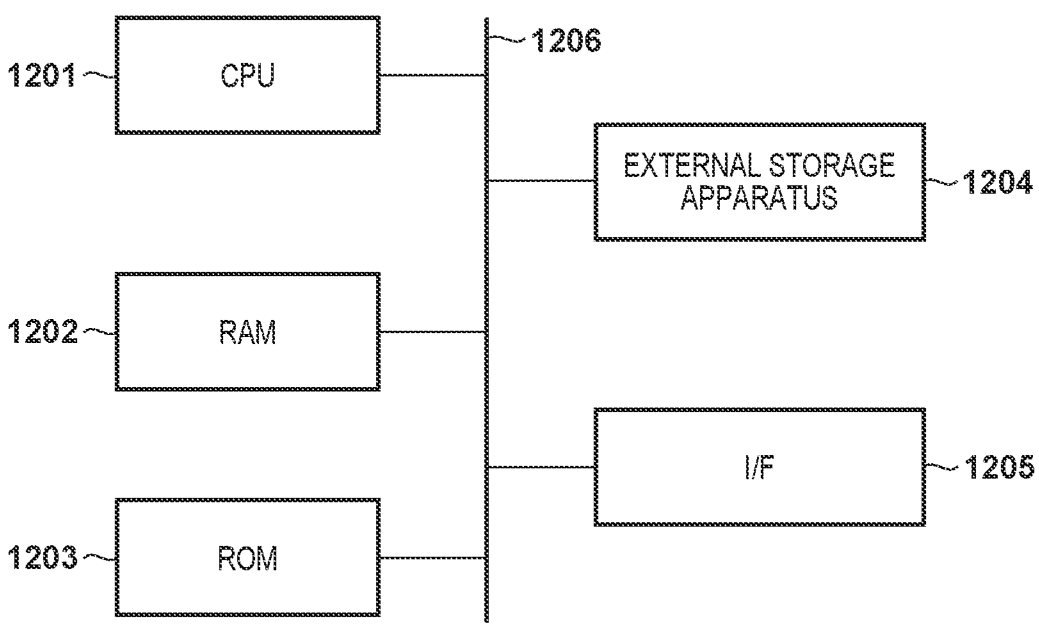

INFORMATION PROCESSING APPARATUS AND METHOD, AND STORAGE MEDIUM

CROSS-REFERENCE TO RELATED APPLICATIONS

This application is a Continuation of International Patent Application No. PCT/JP2022/036386, filed Sep. 29, 2022, which claims the benefit of Japanese Patent Application No. 2021-163724, filed Oct. 4, 2021, both of which are hereby incorporated by reference herein in their entirety.

BACKGROUND OF THE INVENTION

Field of the Invention

The present disclosure relates to an information processing apparatus and method, and a storage medium.

Background Art

In general, a technique has been known that generates a virtual viewpoint video from a virtual camera of an arbitrary position and line-of-sight direction based on a plurality of captured images obtained by arranging a plurality of cameras (hereinafter referred to as physical cameras for distinction from the virtual camera) around an object. The virtual viewpoint video is a video from a viewpoint of the virtual camera, which is not dependent on the actual installation positions of the physical cameras; therefore, a video that cannot be obtained from the physical cameras can be generated by an operator freely selecting a viewpoint of the virtual camera.

In generation of a virtual viewpoint video, as described in PTL 1, processing for generating a three-dimensional model of an object based on a plurality of captured images from a plurality of physical cameras, and rendering processing for coloring the three-dimensional model using the videos of the physical cameras, are executed.

CITATION LIST

Patent Literature

PTL 1: Japanese Patent Laid-Open No. 2021-022032

In generation of a virtual viewpoint video, the higher the precision of the generated three-dimensional model, the higher the precision of the virtual viewpoint video that can be generated, but the larger the quired computation amount. Therefore, compatible specifications are determined in accordance with the performance of an information processing apparatus that executes computation processing, such as a server. Specifically, the size of a space targeted for generation of a three-dimensional model, the precision of the three-dimensional model to be generated, a time period required for generation of the three-dimensional model, and the like are subject to constraints depending on the performance of the information processing apparatus.

Furthermore, a processing load on generation of a three-dimensional model is also influenced by the frequency of generation of the three-dimensional model in accordance with an object. However, PTL 1 does not suggest control on the frequency of generation of a three-dimensional model in accordance with an object.

SUMMARY OF THE INVENTION

An aspect of the present disclosure provides a technique that allows appropriate control on the generation frequency of a three-dimensional model.

According to one aspect of the present disclosure, there is provided an information processing apparatus comprising: one or more memories storing instructions; and one or more processors executing the instructions to: generate a three-dimensional model of an object at a specific frequency based on a plurality of videos obtained from a plurality of image capture apparatuses; identify a change with time passage in the three-dimensional model of the object; and change the specific frequency based on the change with time passage in the three-dimensional model of the object.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

FIG. 3 is a diagram illustrating timings at which three-dimensional model generation processing and move determination processing are executed.

FIG. 9 is a flowchart of processing load reduction control according to the second embodiment.

FIG. 12 is a block diagram showing an exemplary hardware configuration of an information processing apparatus.

DESCRIPTION OF THE EMBODIMENTS

Figure 1:
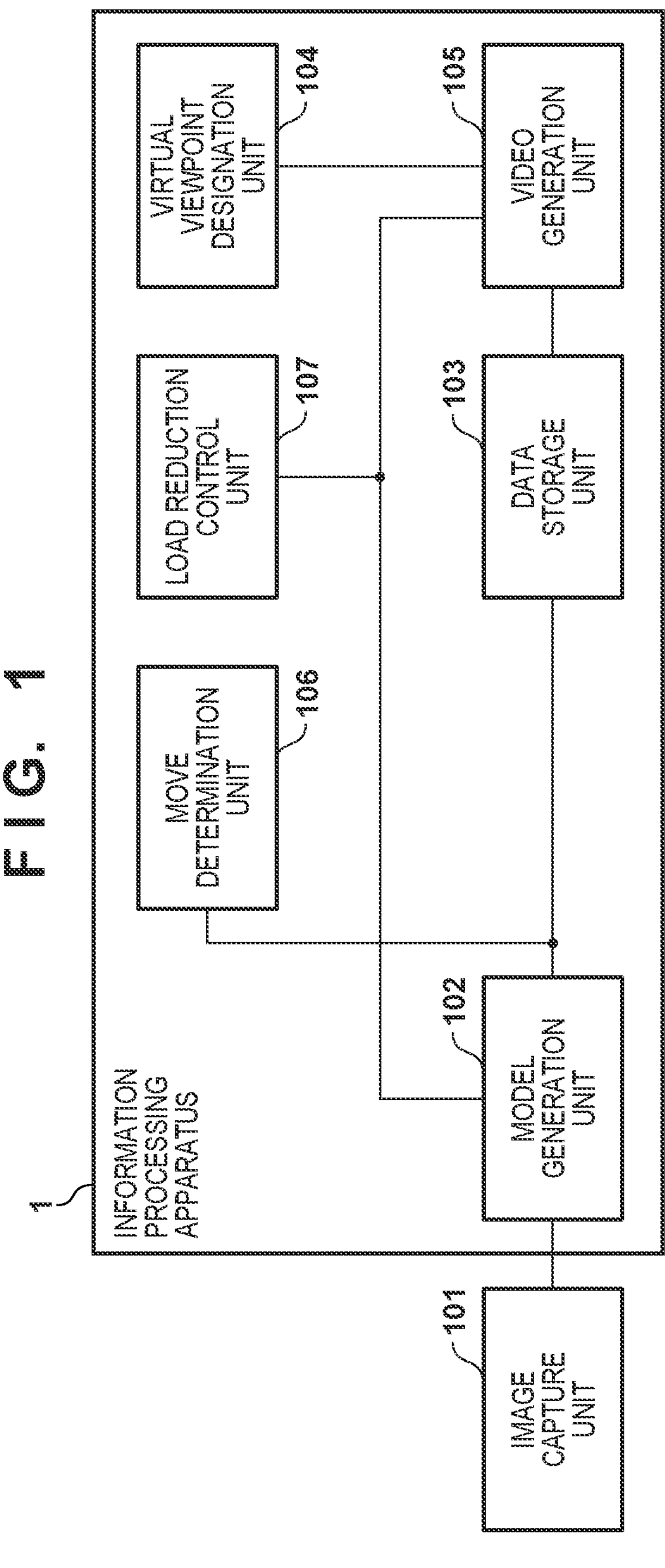
FIG. 1 is a block diagram of a video generation system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1 is a diagram showing an exemplary configuration of a video generation system according to a first embodiment. The video generation system of the present embodiment includes an information processing apparatus 1 and an image capture unit 101. The image capture unit 101 includes a plurality of image capture apparatuses (hereinafter, physical cameras). The plurality of physical cameras are arranged so as to surround an object, and perform image capture in synchronization. Note that the number and the arrangement of the physical cameras are not particularly limited. The information processing apparatus 1 generates a virtual viewpoint video viewed from a virtual viewpoint based on a plurality of videos obtained from the plurality of physical cameras included in the image capture unit 101.

In the information processing apparatus 1, a model generation unit 102 generates foreground images by extracting the object as a foreground from frames of the same time, which are in the plurality of videos transmitted from the image capture unit 101, and generates a three-dimensional model from the foreground images. A known technique can be used to extract a foreground; in the present embodiment, no restriction is placed on a method of extracting a foreground. For example, a method of extracting a foreground from a captured image using background subtraction information has been known. This is a method of obtaining a foreground image by capturing an image of a state where no foreground exists as a background image in advance, calculating the differences between an image in which a foreground exists and the background image, and extracting pixel positions where the calculated difference values are larger than a threshold as a foreground. There are other various methods of extracting a foreground, such as a method that uses feature amounts in an image that are related to an object and machine learning.

Furthermore, a method of generating a three-dimensional model from foreground images has also been known; the present embodiment is not intended to place any limitations on a method of generating a three-dimensional model. For example, a three-dimensional model can be generated from a foreground using a volume intersection method (hereinafter, Visual Hull). According to the Visual Hull, with respect to an object that is a target of a three-dimensional model, an object silhouette corresponding to a foreground in a video from each physical camera is virtually back-projected from the position of the optical principal point of the physical camera toward the direction of the object. As a result, a cone region is formed that has a vertex at the position of the optical principal position, and a cross-section exhibiting the object silhouette. Then, a three-dimensional model of the object is obtained by yielding an overlapping region (logical conjunction) of the cone regions that have been formed for the respective physical cameras. Alternatively, for example, depth data of a foreground may be obtained through stereo image processing, and a three-dimensional model may be generated based on the depth data.

A data storage unit 103 is, for example, a storage device composed of a physical device such as a hard disk drive (HDD), a solid state drive (SSD), and a flash memory. The data storage unit 103 may not be composed of a single physical device; it may be a set of a plurality of physical devices, or may be a device in a cloud virtualized on a network. The data storage unit 103 stores, for example, the three-dimensional model generated by the model generation unit 102. Also, the data storage unit 103 stores foreground images obtained by extracting an object as a foreground from captured images obtained from the image capture unit 101. The foreground images are used by a video generation unit 105 in order to color the three-dimensional model.

A virtual viewpoint designation unit 104 accepts a designation of a virtual viewpoint made by an operator. The virtual viewpoint is, for example, the three-dimensional position of a virtual camera on the world coordinates, the orientation (direction) of the virtual camera, a focal length, or a principal point (the center of a camera image). Note that there are no constraints on a configuration for designation of a virtual viewpoint by the operator. The operator can designate a desired virtual viewpoint using, for example, a joystick, a mouse, a keyboard, or the like.

The video generation unit 105 generates a virtual viewpoint video by obtaining, through a projection operation, a two-dimensional image of a case where the three-dimensional model of the object that has been read out from the data storage unit 103 has been viewed from the virtual viewpoint. As a result, the virtual viewpoint video from the desired virtual viewpoint is generated. In generation of the virtual viewpoint video, the video generation unit 105 colors the three-dimensional model using color information (textures) of the foreground images. The video generation unit 105 generates a distance image indicating the distances between the respective physical cameras and the respective constituent points of the three-dimensional model. For example, the video generation unit 105 determines a color to be applied to a point of the three-dimensional model by selecting a physical camera at the shortest distance from this point with reference to the distance image, and obtaining color information of a pixel position corresponding to this point from a foreground image of the selected physical camera. The video generation unit 105 executes such coloring processing with respect to every point at which coloring of the three-dimensional model is necessary. Note that the present embodiment is not intended to place any restrictions on the coloring processing, and various known methods can be applied. For example, a color to be applied to a point of the three-dimensional model may be determined by blending the colors obtained from a plurality of physical cameras that are located within a predetermined distance range from this point.

The aforementioned three-dimensional model generation processing executed by the model generation unit 102 is executed in such a manner that the videos transmitted from the plurality of physical cameras included in the image capture unit 101 are collected in the information processing apparatus 1, which is connected to the image capture unit 101 via a network. Although Ethernet®, which is most commonly used in computer networks, can be used in the network connection here, no limitation is intended by this. Also, the calculation capability required for the information processing apparatus 1 (model generation unit 102) varies depending on the specifications required for the virtual viewpoint video, the precision required for the three-dimensional model, and the like. While a personal computer, a workstation, or a server is a possible form of the information processing apparatus 1, there are no constraints on the form of the information processing apparatus 1. Furthermore, the information processing apparatus 1 may 1 may be composed of a plurality of apparatuses, and the function units shown in FIG. 1 may be shared among the plurality of apparatuses.

The flow of processing for generating the virtual viewpoint video is as described above; the information processing apparatus 1 of the present embodiment reduces a processing load in the three-dimensional model generation processing by controlling the frequency at which a three-dimensional model is generated in accordance with a magnitude of a movement of an object (a three-dimensional model). This reduction processing is executed by a move determination unit 106 and a load reduction control unit 107. The move determination unit 106 calculates a degree of movement (hereinafter, mobility) based on a change with time passage in a three-dimensional model generated by the model generation unit 102, and determines whether to perform the load reduction based on the calculated mobility. Here, in the present embodiment, the degree of movement based on the change can include, for example, not only a change in the existence position of the three-dimensional model, but also a change in the orientation of the three-dimensional model (e.g., a state where the three-dimensional model is in a horizontal orientation, and a state where the three-dimensional model is in a vertical orientation). Therefore, in the present embodiment, a change in the barycenter of the three-dimensional model is used as the mobility as will be described later. Note that only a change in the position of the three-dimensional model may be used as the mobility. The load reduction control unit 107 issues a control instruction for reducing the processing load to the model generation unit 102 and the video generation unit 105 in accordance with the mobility of the three-dimensional model from the move determination unit 106. Note that the aforementioned load reduction processing executed by the move determination unit 106 and the load reduction control unit 107 is executed with respect to every three-dimensional model generated by the model generation unit 102.

Note that although FIG. 1 shows the configuration in which the function units other than the image capture unit 101 are realized by the information processing apparatus 1, no limitation is intended by this as described above. Each of the plurality of function units that have been described as being implemented by the information processing apparatus 1, or any combination of the plurality of function units, may be realized by an individual information processing apparatus. Also, one function unit shown in FIG. 1 may be realized by a plurality of information processing apparatuses. In these cases, the video system includes a plurality of information processing apparatuses, and these plurality of information processing apparatuses can communicate with one another via network connection.

FIG. 12 is a block diagram showing an exemplary hardware configuration of the information processing apparatus 1 according to the present embodiment. In a case where the video generation system includes a plurality of information processing apparatuses, each individual information processing apparatus has the hardware configuration shown in FIG. 12. A CPU 1201 controls an entire computer using a computer program and data stored in a RAM 1202 and a ROM 1203.

The RAM 1202 provides an area for temporarily storing a computer program and data loaded from an external storage apparatus 1204, data obtained from the outside via an interface (I/F) 1205, and the like. Furthermore, the RAM 1202 provides a working area that is used when the CPU 1201 executes various types of processing. That is to say, for example, the RAM 1202 can be allocated as a frame memory, and can provide various types of other areas as appropriate. The ROM 1203 stores setting data for the present computer, a boot program, and the like.

The external storage apparatus 1204 is a large-capacity information storage apparatus, which is typically a hard disk drive apparatus. An operating system (OS) and a computer program for causing the CPU 1201 to realize the functions of each unit shown in FIG. 1 are stored in the external storage apparatus 1204. Furthermore, various types of image data to be processed may be stored in the external storage apparatus 1204. The computer program and data stored in the external storage apparatus 1204 are loaded to the RAM 1202 as appropriate under control of the CPU 1201, and are to be processed by the CPU 1201. A network such as a LAN and the Internet, and other devices such as a projection apparatus and a display apparatus, can be connected to the I/F 1205. The information processing apparatus 1 can obtain and transmit various types of information via this I/F 1205. 1206 is a bus that connects the discrete units described above.

Next, move determination processing and processing load reduction control for three-dimensional models, which are executed by the move determination unit 106 and the load reduction control unit 107, will be described using FIG. 2 and FIG. 3.

Figure 2:
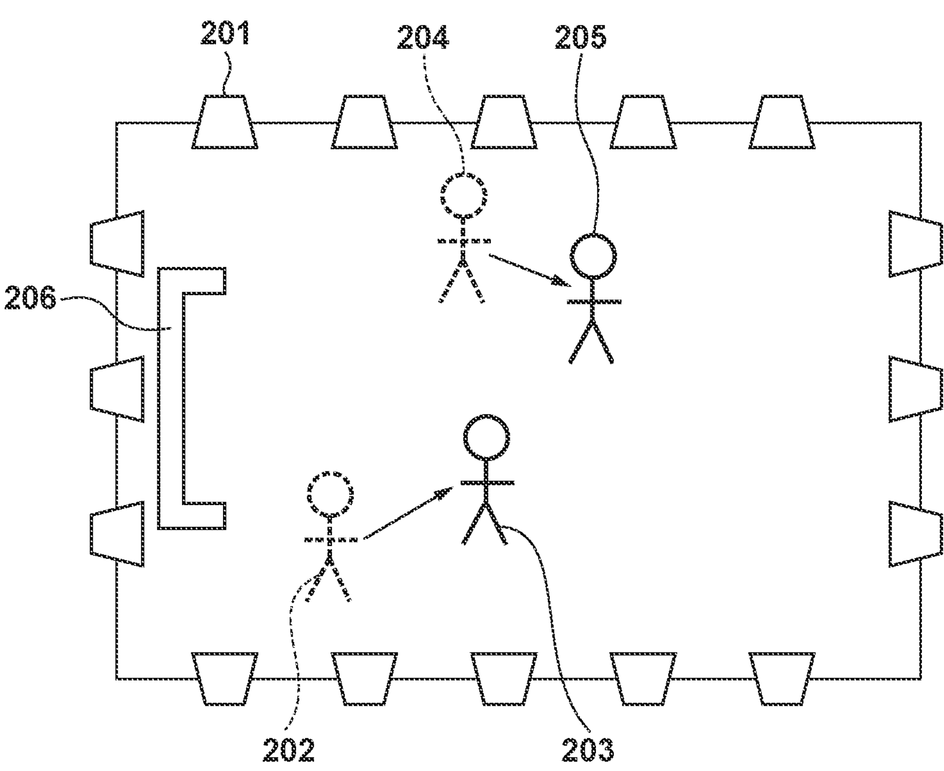
FIG. 2 is an explanatory diagram of three-dimensional models and movements thereof according to the first embodiment.

FIG. 2 shows a scene intended for soccer. A plurality of physical cameras 201 included in the image capture unit 101 surround objects, and perform image capture in synchronization. It is assumed here that the objects that are captured and generated as three-dimensional models are a person 203, a person 205, and a goal 206. Also, a three-dimensional model is generated at a frequency of 60 times per second (60 fps) in parallel with image capture. It is assumed that, in FIG. 2, a three-dimensional model of the person 203 existed at the position of a person 202 and a three-dimensional model of the person 205 existed at the position of a person 204 at time t−10, which is 10 frames ahead of time t at which the three-dimensional models were generated. Note that as a three-dimensional model of the goal 206 does not move, it existed at the same position also at time t−10.

The move determination unit 106 calculates mobility with respect to each of the three-dimensional models of the persons 203 and 205 and the goal 206. Specifically, the difference between the barycenter of each three-dimensional model at time t and the barycenter of each three-dimensional model at time t−10 is set as mobility. There are various methods of calculating the barycenter of a three-dimensional model; in the present embodiment, there are no constraints on a method of calculating the same. For example, the barycenter of a three-dimensional model can be calculated from information of the coordinates at which discrete parts of the three-dimensional model exist and the masses defined as the materials of the discrete parts. In a case where the masses of the respective materials are not defined as the forms of the three-dimensional model, the barycenter may be calculated only from coordinate information, assuming that the masses at the respective positions are the same. Furthermore, to further simplify the calculation of the barycenter, a cuboid that circumscribes the three-dimensional model may be defined, and the center of this cuboid may be used as the barycenter.

In the above-described manner, the barycenters of a three-dimensional model at respective times can be calculated as the coordinates (x, y, z) in a three-dimensional space. The move determination unit 106 uses a magnitude of a difference vector between the barycenter at time t and the barycenter at time t−10 as mobility. For each three-dimensional model, the move determination unit 106 compares the calculated mobility with a preset threshold, and determines that there has been no movement of the three-dimensional model, that is to say, "not moved", between time t and time t−10 in a case where the mobility is smaller than the threshold. Meanwhile, the move determination unit 106 determines that there has been a movement of the three-dimensional model, that is to say, "moved", between time t and time t−10 in a case where the mobility is larger than the threshold. In this way, for each three-dimensional model, the move determination unit 106 generates a move determination result that has a value of "moved" or "not moved". The move determination result is used by the load reduction control unit 107. Note that there are no constraints on the number of bits, the format, and the like of data of the move determination result, and no limitation is intended regarding how the move determination result is represented as data.

Furthermore, in order to grasp a movement of a three-dimensional model, it is necessary to grasp association between the three-dimensional model at time t and another three-dimensional model at another time, for example, time t−10 for determining the movement. In the present embodiment, a three-dimensional model whose barycenter calculated at time t−10 is closest to the barycenter calculated at time t is associated as a three-dimensional model of the same object. Note that association among three-dimensional models is not limited by this; for example, three-dimensional models of the same object at respective times may be associated with one another using a common tracking technique. Alternatively, three-dimensional models at different times may be associated with one another by executing matching processing with respect to feature points extracted from foreground images and three-dimensional models and feature points extracted from foreground images and three-dimensional models at different times. Furthermore, three-dimensional models at different times may be associated with one another by appending a predetermined marker to an object and detecting the positions of this marker. As described above, the present embodiment is not intended to limit a method of associating three-dimensional models at different times with one another. However, as one of the objects of the present embodiment is to reduce the processing load on generation of three-dimensional models, an increase in the processing load for associating three-dimensional models at different times with one another is not desirable. It is sufficient to perform tracking at a granularity where a movement is detected on a per-model basis, and tracking of fine parts such as human fingers is unnecessary. Therefore, it is sufficient to perform simplified tracking at a level of comparison between barycenters as described above.

The load reduction control unit 107 issues an instruction for processing load reduction control for each three-dimensional model to the model generation unit 102. In the case of FIG. 2, as the three-dimensional model of the goal 206 does not move, the move determination result obtained by the move determination unit 106 therefor is "not moved". The load reduction control unit 107 issues, to the model generation unit 102, a control instruction for reducing the processing load with respect to a three-dimensional model that has been determined to have "not moved" in this way. In the present embodiment, the load reduction control unit 107 issues a control instruction for suspending generation of a certain three-dimensional model of an object in a case where the move determination result for this three-dimensional model is "not moved", and for resuming generation of this three-dimensional model of the object in a case where the move determination result therefor is "moved". While the instruction for suspending generation of the three-dimensional model is issued by this control instruction, the model generation unit 102 does not generate three-dimensional models of the corresponding object. In the example of FIG. 2, the model generation unit 102 does not execute the three-dimensional model generation processing for the goal 206 until the move determination result obtained by the move determination unit 106 for the three-dimensional model of the goal 206 becomes "moved".

While the three-dimensional model generation processing is not executed, the latest three-dimensional model is continuously used at the time when the determination result indicates "not moved". For example, in a case where the goal 206 has been determined to have "not moved" at time t, the three-dimensional model of the goal 206 is not generated at time t+1 onward, and the three-dimensional model at time t is repeatedly used as the three-dimensional model of the goal 206 at time t+1 onward. Thereafter, a three-dimensional model of the goal 206 is generated at time t+10, and the move determination unit 106 determines whether the three-dimensional model has moved. Note that, as will be described later, in a case where a simplified three-dimensional model is generated and a movement is determined, if the determination result indicates "not moved" at time t there is no three-dimensional model at time t. In this case, the three-dimensional model at time t−1 is used.

Once the three-dimensional model has been determined to have "not moved", the model generation unit 102 does not newly generate a three-dimensional model, and writes the latest three-dimensional model that has already been generated into the data storage unit 103. Alternatively, after generation of a three-dimensional model of a certain object has been suspended, pointer information indicating a storage location of the three-dimensional model of this object that has been generated most recently in the data storage unit 103 may be stored into the data storage unit 103 as three-dimensional model information. This can reduce the amount of data of three-dimensional models stored in the data storage unit 103. Although it is assumed here that the file format of the pointer information is a shortcut of the Windows® OS, a symbolic link of the Linux® OS, or the like, no restriction is placed on the data format of the pointer information. Alternatively, in a case where generation of a three-dimensional model has been suspended, the model generation unit 102 may write model generation omission flag information indicating that model generation is to be omitted into the data storage unit 103. For example, when the video generation unit 105 has read out model generation omission flag information from the data storage unit 103 in relation to a three-dimensional model of the goal 206, it reads out the latest three-dimensional model among the three-dimensional models of the goal 206 stored in the data storage unit 103 and uses the same.

Note that even if generation of a three-dimensional model has been suspended in the above-described manner, foreground images for coloring three-dimensional models are newly stored. Even in a case where an object has exhibited a small movement and the change in the shape thereof is small, there is a possibility that the way the object looks, that is to say, the color of the object, is changed by an external factor such as lighting. By constantly storing the latest foreground images, appropriate coloring of a three-dimensional model can be realized. However, when it is expected that the color will not be changed by an external factor, storing of foreground images intended for use in coloring may be omitted. Furthermore, the user may be allowed to select whether to carry out such omission regarding foreground images. Note that in a case where storing of foreground images is omitted, pointer information and flag information are stored into the data storage unit 103 similarly to a case where storing of three-dimensional models is omitted.

Note that while the barycenter of a three-dimensional model at time t is calculated in order to determine the mobility of the three-dimensional model at time t, it is necessary to generate the three-dimensional model to calculate the barycenter. Therefore, even if generation of a three-dimensional model has been suspended based on mobility, the three-dimensional model at time t has been generated, and generation of a three-dimensional model is suspended at time t+1 onward. Here, as a three-dimensional model generated for calculation of the barycenter, a simplified three-dimensional model with simplified generation processing may be used. Although there are various types of means for generating a three-dimensional model as described above, it is common that an increase in the precision of a model is accompanied by an increase in the amount of computation in any method. In contrast, in the case of a level where an approximate existence position of a model is to be grasped, it is sufficient to obtain an approximate shape of the model through simplified processing. That is to say, a simplified three-dimensional model may be generated in the stage of obtainment of the barycenter, and a more detailed three-dimensional model may be generated after the model has been determined to have "moved". In this case, when the mobility has been determined to be equal to or smaller than the threshold at time t, a three-dimensional model is not generated thereafter, and thus generation of a three-dimensional model to be used by the video generation unit 105 is suspended from time t.

For example, according to the Visual Hull described earlier, a cube called a voxel is used as the smallest base unit, and a three-dimensional model is handled using a combination of voxels. In a space where the base unit is made large by increasing each side of this voxel, a represented model of an object becomes coarse, but the amount of computation in calculating the model of the object is substantially reduced. In the move determination processing, it is sufficient to obtain the barycenter using a coarse model. Thus, calculating the barycenter by generating a three-dimensional model of an object in a space where each side of the voxel has been increased enables a reduction in the processing load for generating three-dimensional models. Also, in a case where a detailed three-dimensional model is calculated without applying the processing load reduction control with respect to this object, the detailed three-dimensional model of the object can be obtained by processing a simplified three-dimensional model using voxels of fine sizes.

Furthermore, when the video generation unit 105 generates an output video (a virtual viewpoint video), processing for reducing the processing load can be executed under an instruction from the load reduction control unit 107. As described above, when generating an output video, the video generation unit 105 uses color information of foreground images to color a three-dimensional model of an object that has been read out from the data storage unit 103. As described above, in a case where generation of a three-dimensional model or storing of foreground images has been suspended, pointer information and flag information are recorded. In a case where pointer information is recorded, the video generation unit 105 reads out and uses the three-dimensional model and the foreground images stored at the storage location designated by a pointer as the substance of data. That is to say, during a period in which generation of a three-dimensional model has been suspended, the video generation unit 105 repeatedly reads out the same data from the past. Thus, the load reduction control unit 107 instructs the video generation unit 105 to omit this readout processing. While the instruction for omitting the readout processing is issued by the load reduction control unit 107, the video generation unit 105 uses data of the three-dimensional model and the foreground images that have been read out at the nearest time in the past instead. By using these three-dimensional model and foreground images instead, unnecessary readout is suppressed, thereby enabling a reduction in the processing load. Furthermore, as a time period and a band that are required for data readout are reduced, the degree of freedom of necessary equipment can be increased, and the computation capability can be diverted to other functions such as a function of increasing the image quality of videos.

Next, a temporal relationship between the three-dimensional model generation processing executed by the model generation unit 102 and the move determination processing executed by the move determination unit 106 will be described using FIG. 3. Times t1 to t60 in the upper level of FIG. 3 indicate the times at which the three-dimensional model generation processing is executed. In the example of FIG. 3, a three-dimensional model is generated at 60 fps. The times t1 to t60 indicate an interval of 1/60 seconds, and the three-dimensional model generation processing is executed 60 times per second. In the present example, t1 to t60 correspond to the times of frames, and normally, a three-dimensional model is generated on a per-frame basis. In contrast, the move determination processing for a three-dimensional model is executed at a time interval longer than the time interval of video frames (the time interval of normal three-dimensional model generation processing). For example, the move determination processing is executed at a time interval that is M times the time interval of video frames (where M is a natural number equal to or larger than two), and the barycenter of a three-dimensional model in the current frame is compared with the barycenter of a three-dimensional model in a frame that is M frames ahead of the current frame. For example, in the present embodiment, the move determination processing is executed at an execution frequency that is 1/10 of an execution frequency of the three-dimensional model generation processing, that is to say, at a timing at which time t is a multiple of 10. In the lower level of FIG. 3, each of t10, 20, . . . , 60 indicates the execution timing of the move determination processing; in the present example, the move determination processing is executed six times per second. At time t20, the mobility is determined using the barycenters of three-dimensional models at time t20 and time t10.

Note, it is assumed that the user can freely set the frequency of the move determination processing. In a case where the frequency of the move determination processing is set to be high, a movement of a three-dimensional model can be detected quickly compared to a case where the frequency thereof is set to be low. However, an increase in the number of times the move determination processing is executed per certain time period increases the processing load, thereby reducing the advantageous effects of reduction in the processing load in the system as a whole. Conversely, in a case where the frequency of the move determination processing is set to be low, the processing load of the move determination processing itself becomes small, but the detection of a movement of a three-dimensional model decreases in speed. As a result, a three-dimensional model that is actually moving looks stationary during the execution interval of the move determination processing, and a video looks unnatural if this execution interval becomes long. It is desirable to set the frequency of the move determination processing based on the balance between the aforementioned matters.

Although FIG. 2 shows an example of soccer, a goal exists also in other sports such as rugby and basketball; compared to a person, a goal represents a large model among objects. As generation of a larger model leads to a larger processing load, the processing load is significantly reduced by not executing the three-dimensional model processing for a goal. Furthermore, as a stationary object that does not move, such as a goal, is constant as a shape of a model, there is no problem in terms of the appearance to the user. In addition, as the model move determination is executed at a constant interval, more natural images are obtained also with respect to a stationary object that moves occasionally. For example, in a case intended for soccer as in FIG. 2, a corner flag that may or may not be moved by wind, a water bottle placed near a field, which is moved by a player, and the like are case examples of such a stationary object.

Figure 4:
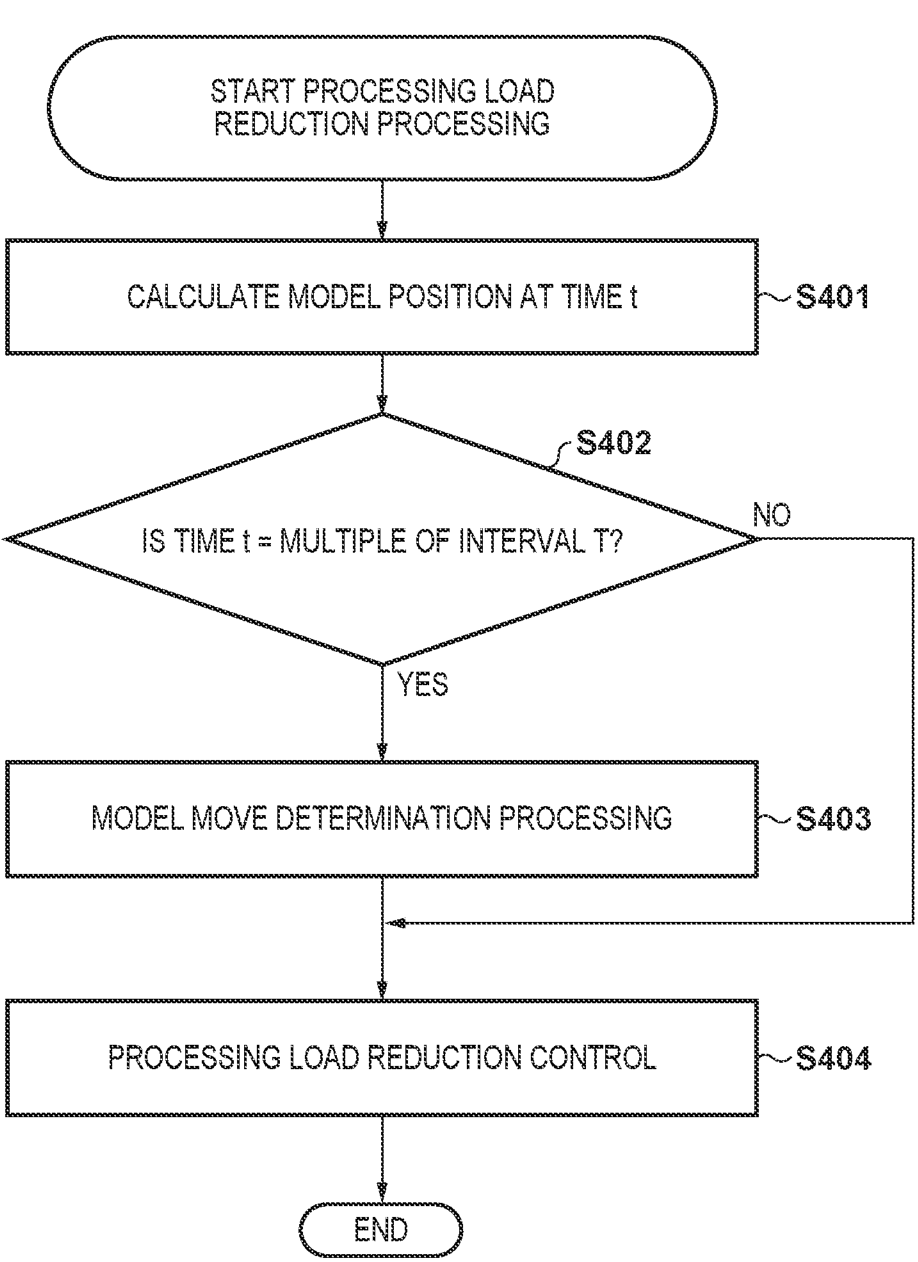
FIG. 4 is a flowchart of processing load reduction processing according to the first embodiment.
Figure 5:
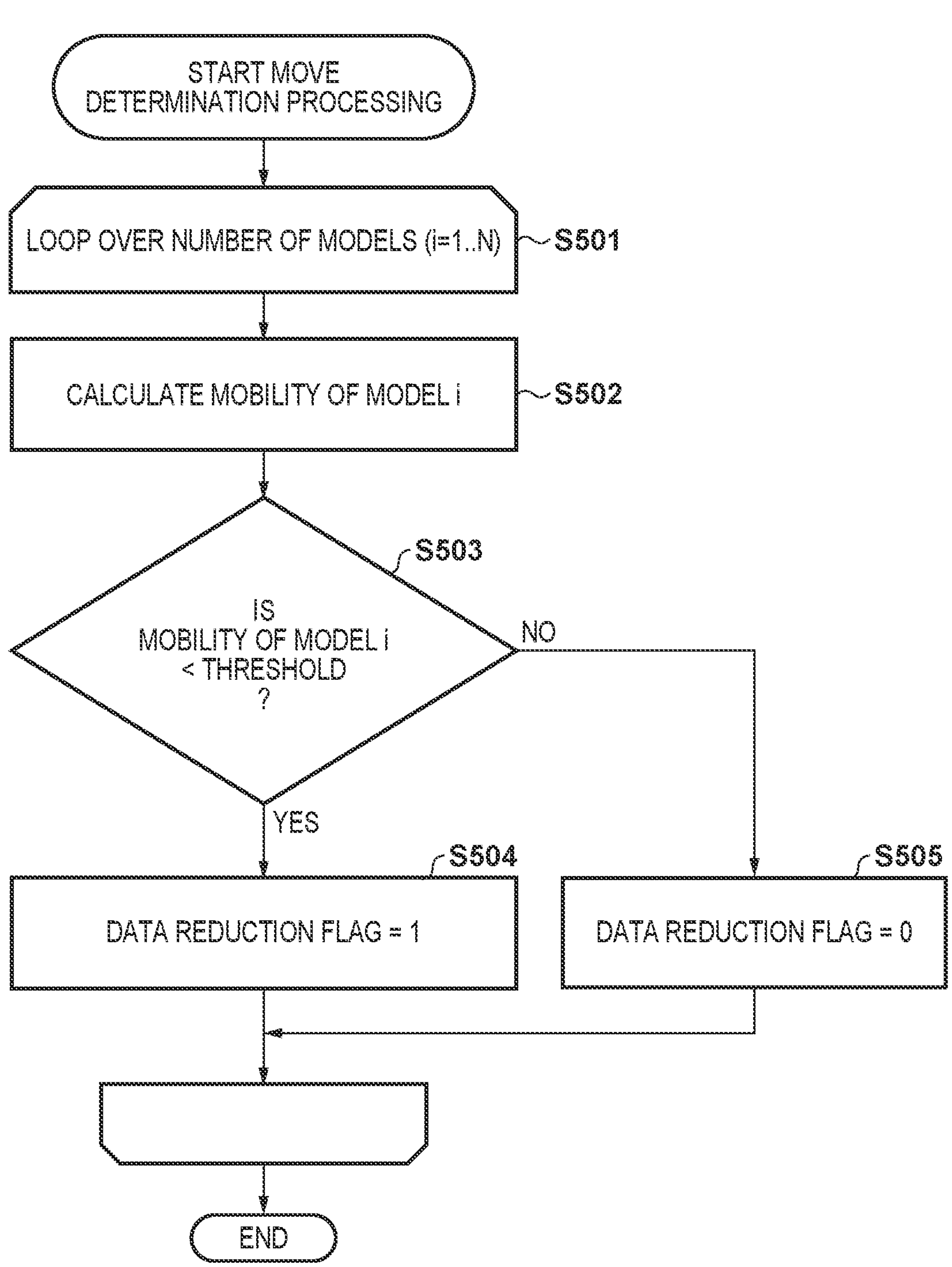
FIG. 5 is a flowchart of the move determination processing according to the first embodiment.
Figure 6:
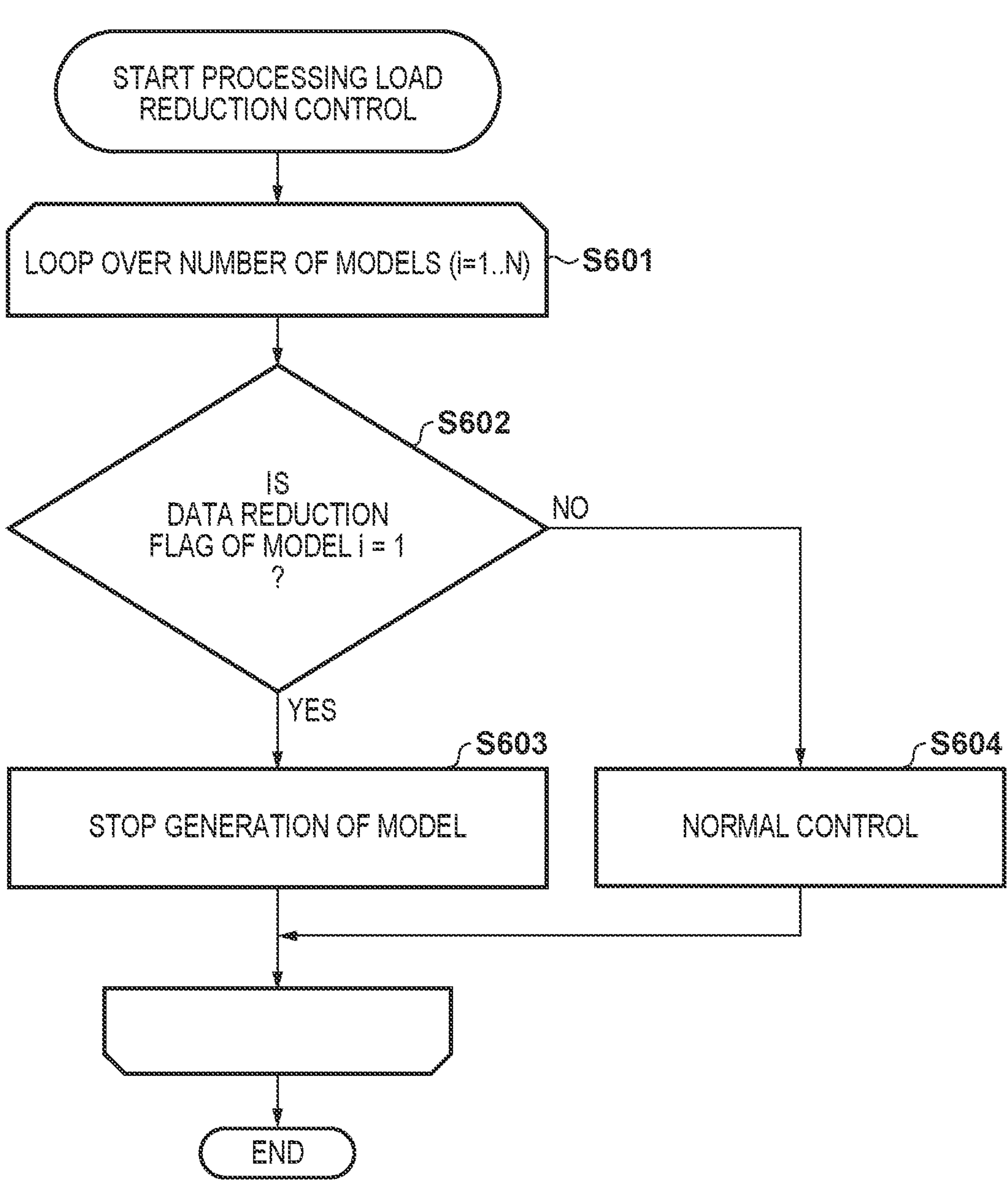
FIG. 6 is a flowchart of processing load reduction control according to the first embodiment.

The processing load reduction processing according to the first embodiment will be described using flowcharts of FIG. 4, FIG. 5, and FIG. 6. FIG. 4 is a flowchart showing a flow of an entirety of the processing load reduction processing according to the first embodiment. FIG. 5 is a flowchart of the move determination processing according to the first embodiment. FIG. 6 is a flowchart of the processing load reduction control according to the first embodiment.

First, the flow of the entirety of the processing load reduction processing will be described with reference to the flowchart of FIG. 4. The model generation unit 102 calculates a model position of an object at time t(S401). The move determination unit 106 determines whether the current time t is the time after the elapse of a time period that is a multiple of an interval T since a preset time (S402). For example, in a case where the preset time is t0, whether time t is t0+nT (where n is a natural number) is determined. In a case where it has been determined that the current time t is the time after the elapse of a multiple of the interval T since the predetermined time t0 (YES of S402), the move determination unit 106 executes the move determination processing (S403). The move determination processing will be described with reference to the flowchart of FIG. 5. The load reduction control unit 107 executes the processing load reduction control at time t in accordance with a determination result of the move determination processing that has been executed until then (S404). The processing load reduction processing will be described separately using the flowchart of FIG. 6.

The following describes the move determination processing executed by the move determination unit 106 using the flowchart of FIG. 5. The move determination processing is executed with respect to all three-dimensional models in sequence (S501). Hereinafter, it is assumed that the number of existing three-dimensional models is N, and a three-dimensional model that is selected as a processing target in sequence from among the N three-dimensional models is described as a model i. The move determination unit 106 calculates the mobility of the model i (S502). In a case where the calculated mobility of the model i is smaller than a preset threshold (YES of S503), the move determination unit 106 sets a data reduction flag for the model i to 1 (S504). On the other hand, in a case where the mobility of the model i is equal to or larger than the preset threshold (NO of S503), the move determination unit 106 sets the data reduction flag for the model i to 0 (S505). The move determination unit 106 executes the foregoing processing (S502 to S505) with respect to all of the N models.

Next, the processing load reduction control executed by the load reduction control unit 107 will be described using the flowchart of FIG. 6. The load reduction control unit 107 is put in operation with respect to all three-dimensional models in sequence (S601). Hereinafter, it is assumed that the number of existing three-dimensional models is N, and a three-dimensional model that is selected as a processing target in sequence from among the N three-dimensional models is described as a model i. In a case where the data reduction flag for the model i is set to 1 (YES of S602), the load reduction control unit 107 suspends generation of a three-dimensional model with respect to an object of the model i (S603). In this way, the model generation unit 102 and the video generation unit 105 execute the processing load reduction control. When generation of a three-dimensional model has been suspended with respect to the object of the model i, a three-dimensional model at a time in the past is used instead as described above. On the other hand, in a case where the data reduction flag for the model i has been set to 0 (NO of S602), the load reduction control unit 107 does not execute the processing load reduction control with respect to the object of the model i, and the model generation unit 102 generates three-dimensional models as usual (S604). In this way, the model generation unit 102 and the video generation unit 105 execute processing as usual with respect to the model i.

As described above, according to the first embodiment, the amount of computation necessary for generation of three-dimensional models for generating a virtual viewpoint video can be suppressed.

Second Embodiment

In the first embodiment, the processing load related to generation of a three-dimensional model is reduced by controlling whether to execute or suspend generation of a three-dimensional model based on whether the result of determination about mobility indicates "moved" or "not moved". A second embodiment will be described in relation to a configuration that categorizes a level of mobility into three or more levels to control generation of a three-dimensional model. Note that the configurations of the video generation system and the information processing apparatus 1 are similar to those of the first embodiment (FIG. 1). The following mainly describes the differences from the first embodiment.

Figure 7:
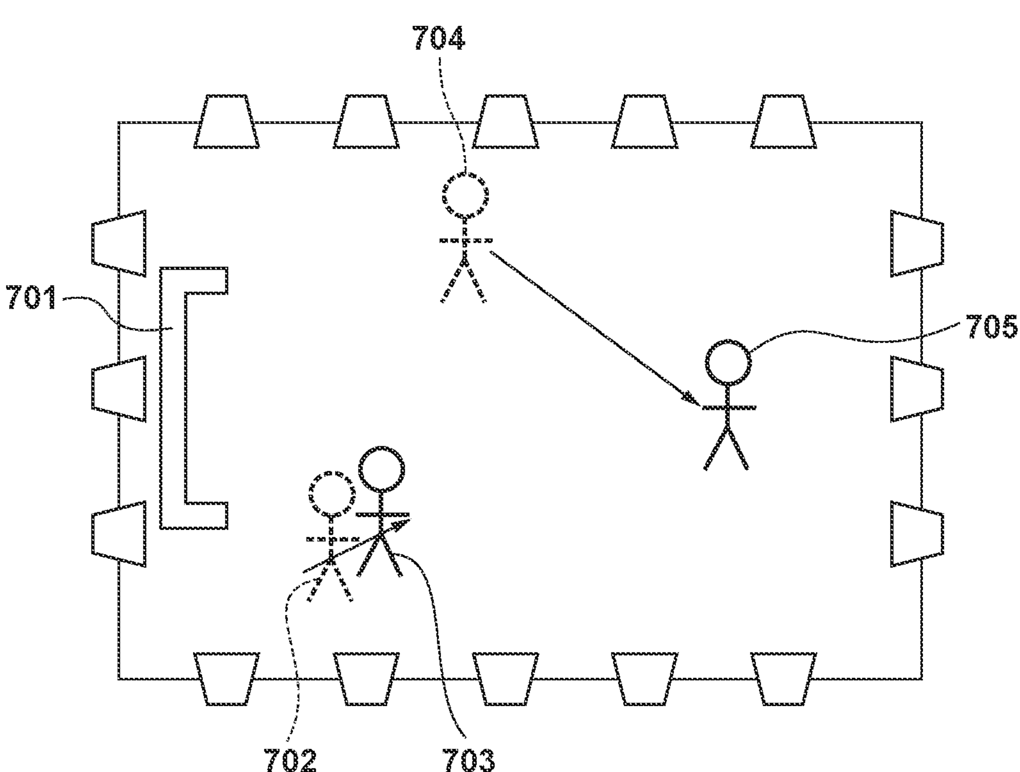
FIG. 7 is an explanatory diagram of three-dimensional models and movements thereof according to a second embodiment.

FIG. 7 is a diagram showing the examples of three-dimensional models and movements thereof in the second embodiment, and is intended for a scene of soccer similarly to FIG. 2. In FIG. 7, three-dimensional models of a goal 701, a person 702, and a person 704 were generated at time t−10. Also, at time t, the three-dimensional model of the goal 701 has not moved, the three-dimensional model of the person 702 has moved to the position of a three-dimensional model of a person 703, and the three-dimensional model of the person 704 has moved to the position of a three-dimensional model of a person 705. The move determination unit 106 according to the first embodiment compares the mobilities of the respective three-dimensional models with a threshold to determine whether each three-dimensional model is a target of the processing load reduction control. Specifically, a model is a target of the processing load reduction processing in a case where the mobility is smaller than the threshold, and is not a target of the processing load reduction processing in a case where the mobility is equal to or larger than the threshold. In contrast, the move determination unit 106 and the load reduction control unit 107 of the second embodiment determine a data reduction level among multiple levels in accordance with the mobility of a three-dimensional model, rather than whether the model is a target of the processing load reduction processing, and execute the processing load reduction control of a level that varies with each data reduction level.

In the examples of FIG. 7, the three-dimensional model of the goal 701, which has not moved, is determined to have a data reduction level of "1", and the model generation unit 102 suspends generation of a three-dimensional model therefor similarly to the first embodiment. The three-dimensional model of the person 705, which has a large mobility, is determined to have a data reduction level of "3", for example. In this case, normal model generation processing is executed similarly to a case where the data reduction flag is "0" in the first embodiment. The three-dimensional model of the person 703, which has a small mobility, is determined to have a data reduction level of "2", and the frequency of model generation processing therefor is reduced compared to a normal case. For example, the model generation unit 102 generates a normal three-dimensional model (a three-dimensional model with a data reduction level of "3") at a frequency of 60 times per second (60 fps), and generates a three-dimensional model with a data reduction level of "2" at a frequency of 30 times per second (30 fps).

Figure 8:
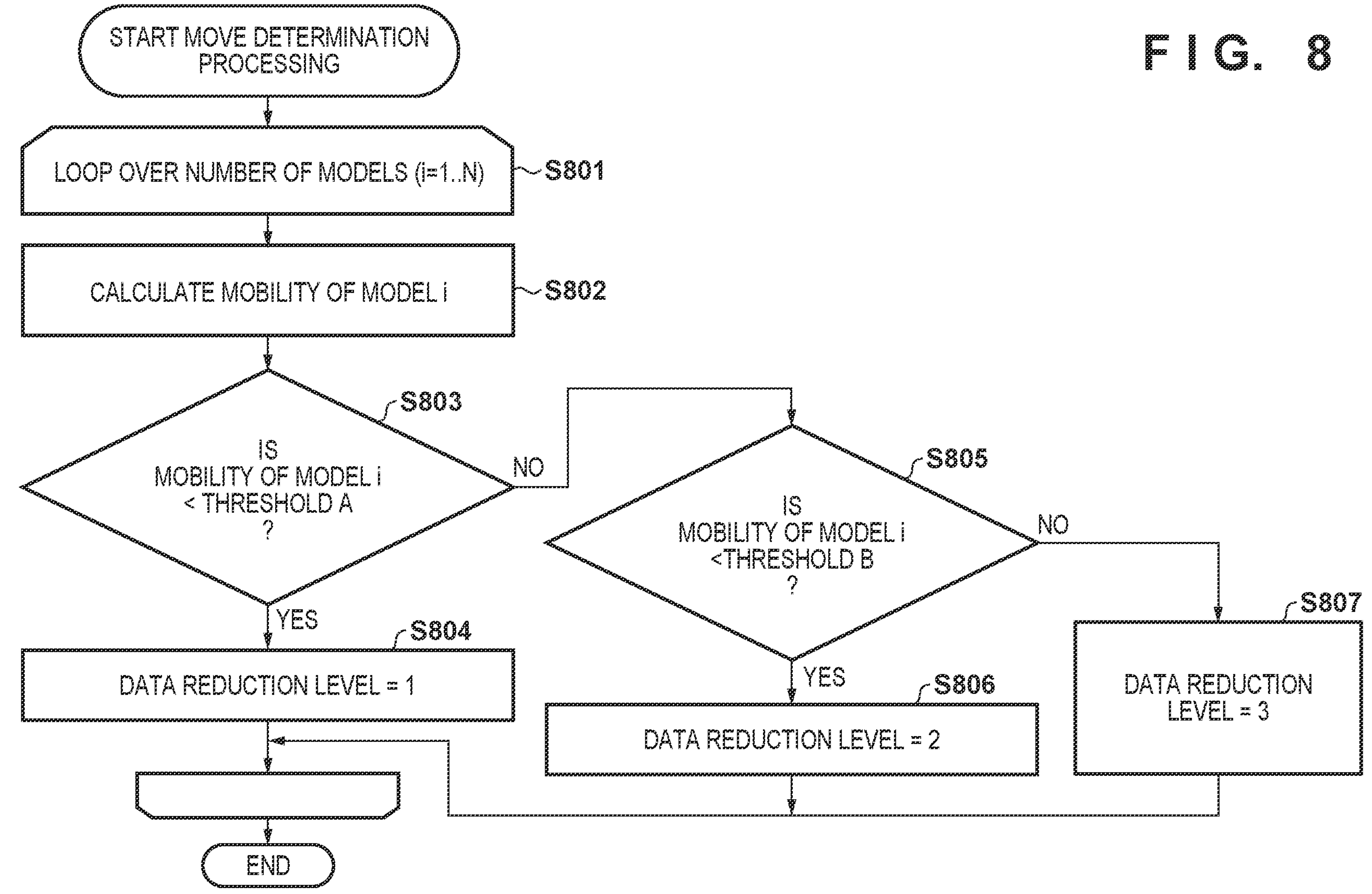
FIG. 8 is a flowchart of move determination processing according to the second embodiment.

Processing for determining a data reduction level according to the second embodiment will be described using a flowchart of FIG. 8. The processing flow of the entirety of the processing load reduction processing is similar to the flowchart of FIG. 4. However, the move determination processing shown in FIG. 5 in the first embodiment is replaced with the processing shown by the flowchart of FIG. 8 in the second embodiment. Also, the processing of the processing load reduction control shown in FIG. 6 in the first embodiment is replaced with the processing shown by the flowchart of FIG. 9 in the second embodiment.

The move determination unit 106 repeats the processing as many times as there are three-dimensional models (S801). It is assumed that the number of existing three-dimensional models is N, and a three-dimensional model that is selected as a processing target in sequence from among the N three-dimensional models is described as a model i. The move determination unit 106 calculates the mobility of the model i (S802). The mobility is calculated in a manner similar to the first embodiment. Next, the move determination unit 106 determines whether the mobility calculated in S802 is smaller than a threshold A (S803). In a case where the mobility is smaller than the threshold A (YES of S803), the move determination unit 106 sets the data reduction level of the model i to "1" (S804). On the other hand, in a case where the mobility calculated in S802 is equal to or larger than the threshold A (NO of S803), the move determination unit 106 compares this mobility with a threshold B that is larger than the threshold A (S805). In a case where the mobility is smaller than the threshold B (YES of S805), the move determination unit 106 sets the data reduction level of the model i to "2" (S806). In a case where the mobility is equal to or larger than the threshold B (NO of S805), the move determination unit 106 sets the data reduction level of the model i to "3" (S807).

Next, the processing load reduction control executed by the load reduction control unit 107 will be described using the flowchart of FIG. 9. The load reduction control unit 107 is put in operation with respect to all three-dimensional models in sequence (S901). Hereinafter, it is assumed that the number of existing three-dimensional models is N, and a three-dimensional model that is selected as a processing target in sequence from among the N three-dimensional models is described as a model i. The load reduction control unit 107 determines which one of 1 to 3 is the data reduction level set for the model i (S902). In a case where the data reduction level is 1, the load reduction control unit 107 suspends generation of a three-dimensional model with respect to the object of the model i (S903). This processing is similar to that of the first embodiment (S603 of FIG. 6). Meanwhile, in a case where the data reduction level is 3, the load reduction control unit 107 does not apply the processing load reduction control, and the model generation unit 102 executes the three-dimensional model generation for the object of the model i as usual (S905). This processing is similar to that of the first embodiment (S604 of FIG. 6). In a case where the data reduction level is 2, the load reduction control unit 107 controls the model generation unit 102 so that the frequency of the three-dimensional model generation for the object of the model i becomes lower than a normal frequency (S904).

As described above, according to the second embodiment, the processing load reduction control is executed on a level-by-level basis in accordance with the result of determination about a movement of a model; in this way, the advantageous effects of reduction in the processing load can be achieved also with respect to a model that is not stationary but exhibits a small amount of movement.

Third Embodiment

In the first embodiment and the second embodiment, the processing load related to generation of a three-dimensional model is reduced based on the mobility of the three-dimensional model. A third embodiment will be described in relation to a configuration that controls the processing load reduction processing based on the size, shape, color, and the like of an object in addition to the mobility thereof. Note that the configurations of the video generation system and the information processing apparatus 1 are similar to those of the first embodiment (FIG. 1).

Figure 10:
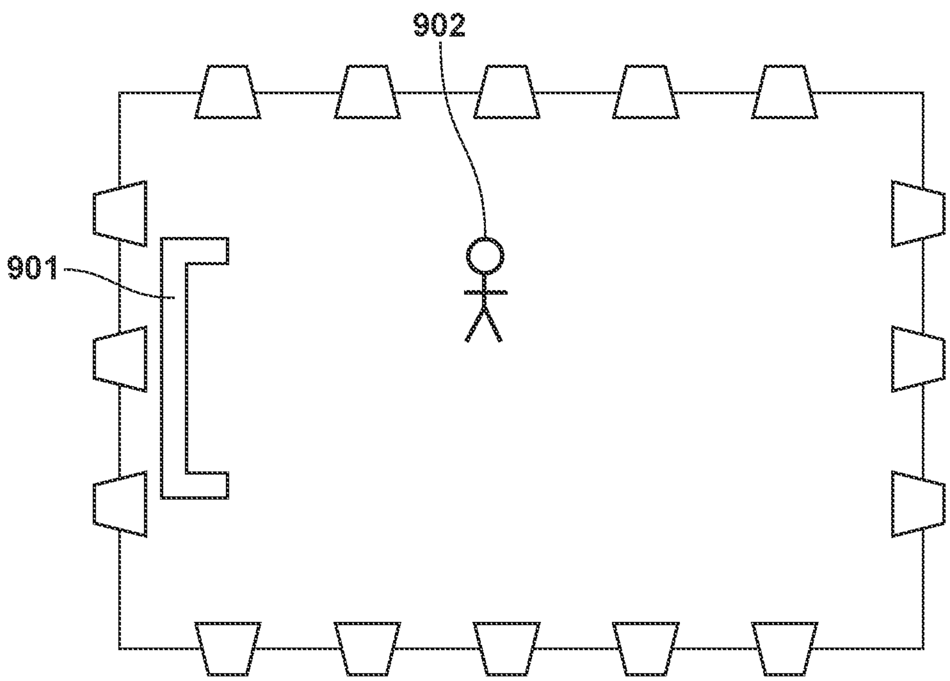
FIG. 10 is a diagram illustrating three-dimensional models according to a third embodiment.

FIG. 10 is a diagram showing examples of three-dimensional models according to the third embodiment, and is intended for a scene of soccer similarly to FIG. 2 and FIG. 7. In FIG. 10, a goal 901 and a person 902 exist as objects for which three-dimensional models are generated. In the third embodiment, the content (attribute) of an object is decided on from the size, shape, and color of a three-dimensional model, and based on the result of this decision, whether the object of the three-dimensional model is a target of the processing load reduction is determined. With regard to an object that has not been determined to be the target of the processing load reduction, generation of a three-dimensional model is executed as usual regardless of the mobility thereof. For example, in a case where the size of a generated three-dimensional model is smaller than a preset threshold, the move determination unit 106 determines that the three-dimensional model is not the target of the processing load reduction regardless of the mobility thereof, and sets the data reduction flag therefor to "0". As a three-dimensional model with a size of a person is often a main object, it is desirable that this three-dimensional model be a target of model generation each time, even if this three-dimensional model does not move much. In view of this, the threshold is set approximately to a size of a person to exclude a three-dimensional model of a person from targets of the processing load reduction; this can suppress the occurrence of inappropriate appearance where a movement of a person is not exhibited as a result of using another three-dimensional model instead. Furthermore, with regard to a three-dimensional model of an object that is larger than a person, such as a goal, the processing load for generation thereof is also large, and thus whether the three-dimensional model is the target of the processing load reduction is determined in accordance with the determination about mobility.

Note that the size of a three-dimensional model can be obtained by, for example, calculating the size of a cuboid that circumscribes the three-dimensional model. Also, in calculation of the size of the three-dimensional model, a simplified three-dimensional model that is used to calculate the barycenter for obtaining the mobility may be utilized. Furthermore, the number of voxels that compose the three-dimensional model may be counted, and the counted number may be used as the size of the three-dimensional model. In the present embodiment, there are no constraints on a method of calculating the size of the three-dimensional model.

Furthermore, although the size of a three-dimensional model is used in determining whether to make the determination based on mobility in the above description, no limitation is intended by this. For example, whether a three-dimensional model is the target of determination that uses mobility may be determined by making a distinction about what the three-dimensional model is more directly. For example, the fact that an object (a three-dimensional model) is a person may be distinguished by learning the person using a technique of machine learning, and the three-dimensional model of the person may be excluded from the targets of the processing load reduction regardless of the mobility thereof. In the present embodiment, no limitation is intended regarding a technique that is used in making such a distinction. By using a distinction technique, whether a three-dimensional model is the target of the processing load reduction can be determined more accurately and more flexibly.

Next, the move determination processing according to the third embodiment will be described using a flowchart of FIG. 11. As described above, in the third embodiment, whether a three-dimensional model is the target of the processing load reduction is determined when the move determination processing is executed. With regard to a three-dimensional model that has not been determined to be the target of the processing load reduction, the data reduction flag is set to 0 without making the determination about mobility, and the three-dimensional model does not act as the target of the processing load reduction in the processing load reduction control.

Figure 11:
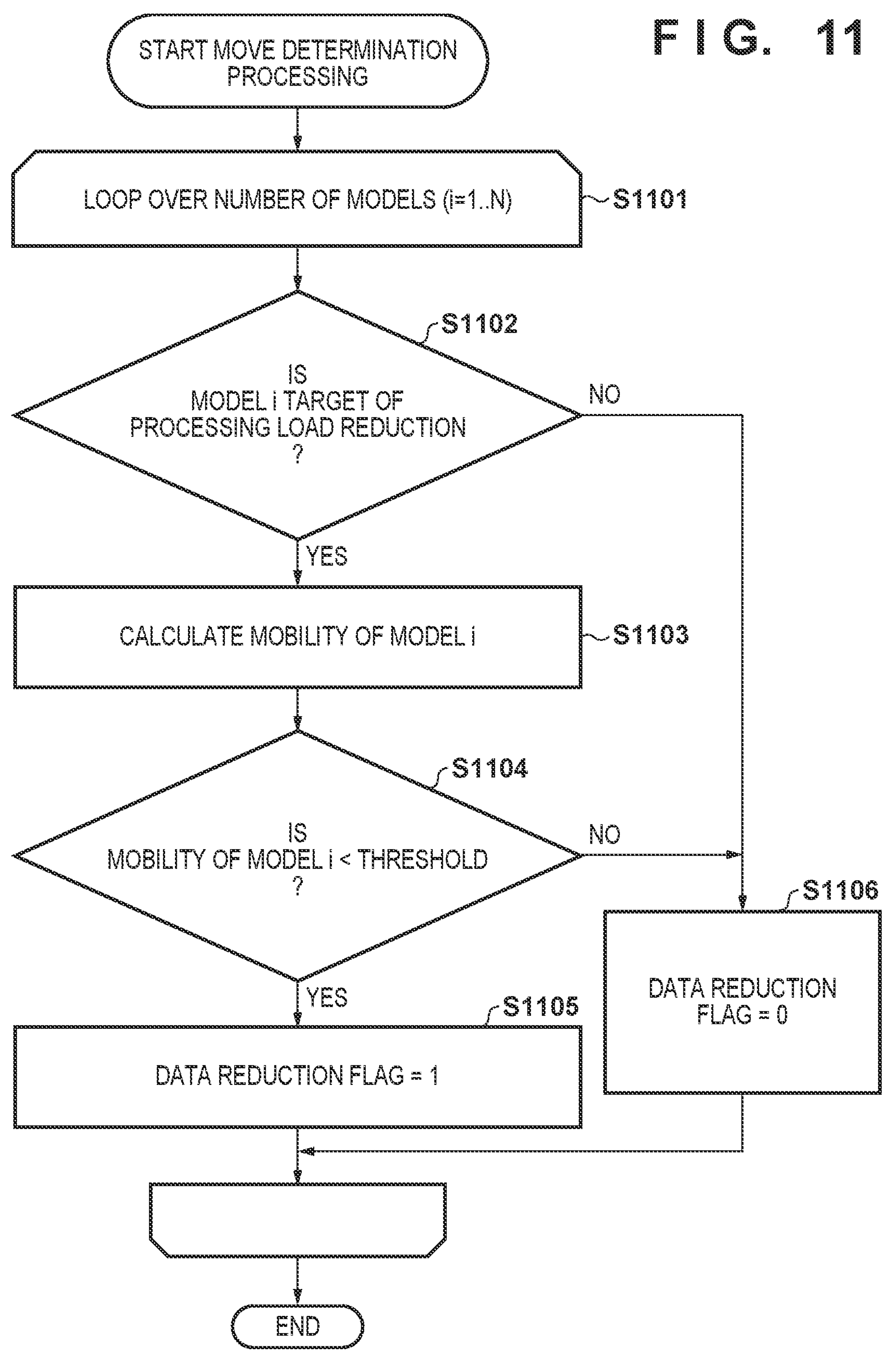
FIG. 11 is a flowchart of move determination processing according to the third embodiment.

The move determination processing shown in FIG. 11 is executed with respect to all three-dimensional models in sequence (S1101). Hereinafter, it is assumed that the number of existing three-dimensional models is N, and a three-dimensional model that is selected as a processing target in sequence from among the N three-dimensional models is described as a model i. The move determination unit 106 determines whether (an object of) the model i is the target of the processing load reduction processing (S1002). As described above, in a case where the size of the model i is smaller than a threshold that has been defined in advance, it is determined that the model i is not the target of the processing load reduction processing. Alternatively, whether the model i is a person may be distinguished, and in a case where the model i is a person, it may be determined that the model i is not the target of the processing load reduction. In a case where it has been determined that the model i is not the target of the processing load reduction (NO of S1102), the move determination unit 106 sets the data reduction flag for the model i to "0" without determining the mobility (S1106). On the other hand, in a case where it has been determined that the model i is the target of the processing load reduction (YES of S1102), the move determination unit 106 calculates mobility with respect to the model i (S1103) similarly to the first embodiment (S502). In a case where the calculated mobility of the model i is smaller than a preset threshold (YES of S1104), the move determination unit 106 sets the data reduction flag for the model i to 1 (S1005). On the other hand, in a case where the mobility of the model i is equal to or larger than the preset threshold (NO of S1004), the move determination unit 106 sets the data reduction flag for the model i to 0 (S1006). The move determination unit 106 executes the foregoing processing (S1002 to S1006) with respect to all of the N models.

Note that although the above has described an example in which the configuration for determining whether an object is the target of the processing load reduction is applied to the configuration of the first embodiment, it can also be applied to the configuration of the second embodiment. In this case, the move determination unit 106 of the third embodiment determines whether the model i is the target of the processing load reduction before execution of S802 of FIG. 8, and sets the data reduction flag for the model i to 1 in a case where it has been determined that the model i is not the target of the processing load reduction (S804). Furthermore, according to the above description, whether the model i is the target of data reduction based on mobility is determined depending on whether the model i is the target of the processing load reduction (S1102); however, no limitation is intended by this. For example, the threshold used in the determination of S1104 may be changed in accordance with the content of the model i. With this configuration, for example, in a case where the model i has been determined to be a person, a three-dimensional model is generated as usual in accordance with finer movements of the person by setting a small threshold in S1104. In this case, in FIG. 11, processing of S1102 is processing in which the move determination unit 106 "sets the threshold based on the content of the model i", rather than processing that bifurcates based on the model i. The threshold set in S1102 is used in the determination processing of S1104.

As described above, according to the third embodiment, an object that is important in video representation can be excluded from targets of the processing load reduction. This can suppress a reduction in the image quality of an important object as a result of using a past model instead with respect to the important object. For example, when an object of a three-dimensional model is a person, even if the model per se barely moves, there are cases where it is desirable that fine movements of a body such as fingertips and facial expressions be represented as much as possible; in these cases, the image quality as a video can be prioritized over a reduction in the processing load.

Other Embodiments

Although the above embodiments have been described in relation to an example in which the frequency is reduced, no limitation is intended by this. That is to say, representation of finer movements of an object may be enabled by increasing the generation frequency of a three-dimensional model of a target object in accordance with the amount of movement of the target object. For example, the generation frequency of a three-dimensional model of an object may be increased in a case where the amount of movement of the object exceeds a threshold, in a case where the amount of movement of the object is larger than the amounts of movements of other objects, and the like. Furthermore, although the generation frequency that acts as a base before increasing or reducing the generation frequency of a three-dimensional model matches the frame rate of shooting in the above-described embodiments, no limitation is intended by this, and the generation frequency that acts as the base may be different from the frame rate of shooting. That is to say, the generation frequency of a three-dimensional model of an object may be changed from a specific frequency that acts as a base based on a change in the three-dimensional model of the object over time. Also, in a case where the generation frequency exceeds the frame rate of shooting, an image may be generated by performing interpolation using the images that correspond to preceding and succeeding frames, and a three-dimensional model may be generated using the generated image. Furthermore, a three-dimensional model of a target frame may be generated by way of supplementation using the three-dimensional models corresponding to preceding and succeeding frames.

According to the present disclosure, the generation frequency of a three-dimensional model can be controlled appropriately.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus, comprising:
one or more memories storing instructions; and
one or more processors executing the instructions to:
generate three-dimensional models of moving objects at a specific frequency based on a plurality of videos obtained from a plurality of image capture apparatuses;
identify a movement with time passage in the three-dimensional model of each object; and
change the specific frequency of each three-dimensional model based on the movement with time passage in the three-dimensional model of each object,
wherein the one or more processors execute the instructions to identify the movement with time passage in the three-dimensional model of the object based on a movement in a barycenter of the three-dimensional model of each object between different times,
in a case where the identified movement with time passage in the barycenter of the three-dimensional model of the object has been determined smaller than a first threshold, the one or more processors execute the instructions to suspend generation of the three-dimensional model of the object,
in a case where the identified movement with time passage in the barycenter of the three-dimensional model of the object has been determined to be equal to or larger than the first threshold and smaller than a second threshold, which is higher than the first threshold, the one or more processors execute the instructions to reduce the specific frequency of the three-dimensional model of the object compared to a normal model generation processing, and
in a case where the identified movement with time passage in the barycenter of the three-dimensional model of the object has been determined to be equal to or larger than the second threshold, which is higher than the first threshold, the one or more processors execute the instructions to perform the normal model generation processing.

2. The information processing apparatus according to claim 1, wherein
the barycenter is a barycenter of a cuboid that circumscribes the three-dimensional model.

3. The information processing apparatus according to claim 1, wherein the one or more processors further execute the instructions to:
generate simplified three-dimensional models of each object that are coarser than a three-dimensional model used in generation of a virtual viewpoint video, and
identify the movement with time passage in the three-dimensional model of each object using the simplified three-dimensional models.

4. The information processing apparatus according to claim 1, wherein
the one or more processors execute the instructions to identify the movement with time passage in each three-dimensional model of each object at a time interval longer than a time interval of frames of the plurality of videos.

5. The information processing apparatus according to claim 4, wherein
the one or more processors execute the instructions to identify the movement with time passage in the three-dimensional model of each object at a time interval that is M times the time interval of the frames of the plurality of videos (where M is a natural number equal to or larger than two) based on a three-dimensional model obtained in a current frame and on a three-dimensional model obtained in a frame that is M frames ahead of the current frame.

6. The information processing apparatus according to claim 1, wherein the one or more processors further execute the instructions to:
store three-dimensional models that have been generated at times of respective frames,
wherein while generation of the three-dimensional model of the object is suspended, a pointer indicating a position of a latest three-dimensional model among three-dimensional models of the object that have already been stored is stored.

7. The information processing apparatus according to claim 6, wherein the one or more processors further execute the instructions to:

generate an image of the object viewed from a virtual viewpoint based on a three-dimensional model of the object, and generate a virtual viewpoint video using the image, wherein the one or more processors execute the instructions to generate the image of the object by reading out the stored three-dimensional model of the object, and in a case where the pointer is stored, the one or more processors execute the instructions to read out the three-dimensional model from the position instructed by the pointer.

8. The information processing apparatus according to claim 6, wherein the one or more processors further execute the instructions to:

generate an image of the object viewed from a virtual viewpoint based on a three-dimensional model of the object, and generate a virtual viewpoint video using the image, wherein the one or more processors execute the instructions to generate the image of the object by reading out the stored three-dimensional model of the object, and in a case where the pointer is stored, the one or more processors execute the instructions to use a three-dimensional model that has already been read out instead.

9. The information processing apparatus according to claim 1, wherein the one or more processors further execute the instructions to:

determine whether the object is a target of changing the specific frequency based on an attribute of the object or the three-dimensional model thereof, and change the specific frequency with respect to the object of the determined target of changing.

10. The information processing apparatus according to claim 9, wherein the one or more processors execute the instructions to determine that the object is the target of changing the specific frequency in a case where a size of the three-dimensional model of the object is larger than a threshold.

11. The information processing apparatus according to claim 9, wherein the one or more processors execute the instructions to determine that the object is not the target of changing the specific frequency in a case where the three-dimensional model of the object has been determined to be a person.

12. The information processing apparatus according to claim 10, wherein the one or more processors further execute the instructions to:

set the threshold based on the attribute of the object or the three-dimensional model of the object.

13. An information processing method, comprising:

generating three-dimensional models of moving objects at a specific frequency based on a plurality of videos obtained from a plurality of image capture apparatuses;

identifying a movement with time passage in the three-dimensional model of each object; and changing the specific frequency of each three-dimensional model in the generating based on the movement with time passage in the three-dimensional model of each object, wherein the movement with time passage in the three-dimensional model of the object is identified based on a movement in a barycenter of the three-dimensional model of each object between different times, in a case where the identified movement with time passage in the barycenter of the three-dimensional model of the object has been determined to be smaller than a first threshold, generation of the three-dimensional model of the object is suspended, in a case where the identified movement with time passage in the barycenter of the three-dimensional model of the object has been determined to be equal to or larger than the first threshold and smaller than a second threshold, which is higher than the first threshold, the specific frequency of the three-dimensional model of the object is reduced compared to a normal model generation processing, and in a case where the identified movement with time passage in the barycenter of the three-dimensional model of the object has been determined to be equal to or larger than the second threshold, the normal model generation processing is performed.

14. A non-transitory computer readable storage medium storing a program for causing a computer to perform an information processing method, comprising:

generating three-dimensional models of moving objects at a specific frequency based on a plurality of videos obtained from a plurality of image capture apparatuses;

identifying a movement with time passage in the three-dimensional model of each object; and changing the specific frequency of each three-dimensional model in the generating based on the movement with time passage in the three-dimensional model of each object, wherein the movement with time passage in the three-dimensional model of the object is identified based on a movement in a barycenter of the three-dimensional model of each object between different times, in a case where the identified movement with time passage in the barycenter of the three-dimensional model of the object has been determined to be smaller than a first threshold, generation of the three-dimensional model of the object is suspended, in a case where the identified movement with time passage in the barycenter of the three-dimensional model of the object has been determined to be equal to or larger than the first threshold and smaller than a second threshold, which is higher than the first threshold, the specific frequency of the three-dimensional model of the object is reduced compared to a normal model generation processing, and in a case where the identified movement with time passage in the barycenter of the three-dimensional model of the object has been determined to be equal to or larger than the second threshold, the normal model generation processing is performed.

* * * * *